(12) United States Patent
Black et al.

(10) Patent No.: US 12,430,699 B1
(45) Date of Patent: *Sep. 30, 2025

(54) OPTIMIZED LOCAL POWER SYSTEMS

(71) Applicant: Nodal Power Systems, Inc., Layton, UT (US)

(72) Inventors: Bryan Richard Black, Salt Lake City, UT (US); James Daniel Sechrest, Salt Lake City, UT (US); Matthew Paul Jones, Lehi, UT (US)

(73) Assignee: Nodal Power Systems, Inc., Layton, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/932,599

(22) Filed: Oct. 30, 2024

Related U.S. Application Data

(63) Continuation of application No. 18/616,717, filed on Mar. 26, 2024, now Pat. No. 12,165,226, which is a continuation of application No. 18/478,156, filed on Sep. 29, 2023, now Pat. No. 11,972,498.

(60) Provisional application No. 63/493,582, filed on Mar. 31, 2023.

(51) Int. Cl.
*G06Q 50/06* (2024.01)
*G05B 23/02* (2006.01)
*H02J 13/00* (2006.01)

(52) U.S. Cl.
CPC ......... *G06Q 50/06* (2013.01); *G05B 23/0254* (2013.01); *H02J 13/00002* (2020.01)

(58) Field of Classification Search
CPC .................. G06Q 50/06; G05B 23/0254; H02J 13/00002
See application file for complete search history.

(56) References Cited

U.S. PATENT DOCUMENTS

| | | |
|---|---|---|
| 6,215,202 B1 | 4/2001 | Luongo |
| 10,862,307 B2 | 12/2020 | Cavness et al. |
| 10,862,309 B2 | 12/2020 | Cavness et al. |
| 2009/0038668 A1* | 2/2009 | Plaisted .................. H10F 77/68 700/274 |

(Continued)

FOREIGN PATENT DOCUMENTS

| | | |
|---|---|---|
| CA | 2824112 A1 | 2/2014 |
| WO | 2018145201 A1 | 8/2018 |

*Primary Examiner* — Ziaul Karim
(74) *Attorney, Agent, or Firm* — Baker Botts L.L.P.

(57) ABSTRACT

In one embodiment, the disclosed technology involves a system having a generator set comprising a first engine and an output terminal coupled to a power distributor, a load comprising two or more sub-loads, wherein each of the sub-loads are coupled to the power distributor via one or more respective electrical contactors, and a controller communicably coupled to the electrical contactors and the generator set comprising a processor, and a memory, the memory having computer-readable instructions stored thereon that, when executed by the processor cause operations. The operations may include determining a number of sub-loads available, receiving data representing power generation of the generator set, determining which of the available sub-loads to connect in order to balance the generator set to the load, and controlling the respective electrical contactors of the determined sub-loads so as to provide electricity to the determined sub-loads.

20 Claims, 6 Drawing Sheets

(56) References Cited

U.S. PATENT DOCUMENTS

| | | | |
|---|---|---|---|
| 2010/0245103 A1* | 9/2010 | Plaisted | F24D 19/1042 |
| | | | 340/657 |
| 2010/0274407 A1* | 10/2010 | Creed | G05B 15/02 |
| | | | 700/295 |
| 2011/0217747 A1 | 9/2011 | Chianelli | |
| 2013/0036311 A1 | 2/2013 | Akyol | |
| 2013/0082640 A1 | 4/2013 | Nishibayashi et al. | |
| 2013/0082641 A1 | 4/2013 | Nishibayashi | |
| 2013/0123998 A1 | 5/2013 | King et al. | |
| 2015/0032583 A1* | 1/2015 | Mello | G06Q 40/12 |
| | | | 705/30 |
| 2015/0121113 A1 | 4/2015 | Ramamurthy et al. | |
| 2016/0036235 A1 | 2/2016 | Getsla | |
| 2016/0209858 A1 | 7/2016 | Ellice-Flint et al. | |
| 2017/0088001 A1 | 3/2017 | Haas | |
| 2018/0109110 A1* | 4/2018 | Gerdes | H02K 7/1815 |
| 2018/0236889 A1 | 8/2018 | Masuda | |
| 2018/0241229 A1 | 8/2018 | Kitaoka et al. | |
| 2018/0278055 A1 | 9/2018 | Shaik | |
| 2019/0061535 A1* | 2/2019 | Bridges | H02J 3/381 |
| 2019/0131804 A1* | 5/2019 | Taniguchi | H02H 7/18 |
| 2019/0168630 A1 | 6/2019 | Mrlik et al. | |
| 2019/0222058 A1* | 7/2019 | Sharifipour | H02J 3/00 |
| 2019/0315481 A1 | 10/2019 | Elliot | |
| 2020/0023832 A1 | 1/2020 | Frampton | |
| 2020/0051184 A1 | 2/2020 | Barbour | |
| 2021/0057913 A1 | 2/2021 | Cavness et al. | |
| 2022/0161677 A1 | 5/2022 | Pizzurro et al. | |
| 2023/0167809 A1 | 6/2023 | Kirch | |

* cited by examiner

OPTIMIZED LOCAL POWER SYSTEMS

BENEFIT CLAIM

This application claims the benefit under 35 U.S.C. § 120 as a continuation of application Ser. No. 18/616,717, filed Mar. 26, 2024, which is a continuation of application Ser. No. 18/478,156, filed Sep. 29, 2023, now U.S. Pat. No. 11,972,498, issued Apr. 30, 2024, which claims the benefit under 35 U.S.C. § 119(e) of provisional patent application 63/493,582, filed Mar. 31, 2023, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Nodal Power, Inc.

TECHNICAL FIELD

One technical field of the disclosure is systems and methods for powering and operating a data center, such as a landfill gas-powered or biogas-powered data center. Another technical field is control systems for methane gas-powered or biogas-powered thermomechanical systems. Another technical field is systems and methods for controlling a localized system having a generator system and a data center that are selectively coupled to a power grid and the harmonization of each. Another technical field is systems and methods for power generation, including systems and methods for power generation for harmonization with other grid-connected systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Power generation centers may lack the ability to be responsive to changes or transient changes in loads or power generation on the grid. Moreover, renewable energy sources such as wind, solar, or biogas-fueled generators may be dependent on the weather and/or related pressure systems within the environment in which they operate. As a result, this may cause additional transients or volatility that need to be accounted for to maintain grid stability. Moreover, even renewable resource power sources that are operating in isolation—for example, not connected to a power grid-suffer from the same volatile electrical power output that prevents an efficient usage of the generated energy.

In the case of biogas-fueled generators, landfills may serve as the energy source. Landfills are used to dispose of waste, including large amounts of organic matter, which may be buried under layers of soil to facilitate decomposition. Landfills are often located far from inhabited areas, sometimes by law or regulation; thus, landfill operators may not have convenient access to the types of infrastructure commonly found in more populated areas.

In landfills, microorganisms acting on organic matter under anaerobic conditions produce biogas, which is also known as landfill gas. Landfill gas typically comprises a mixture of methane, carbon dioxide, and other trace gases and vapors. A large percentage of the available energy of the organic matter may be retained in biogas as methane. Thus, methane-rich biogas may have a high calorific value and can be used as a fuel. However, there are several technical challenges associated with using landfill gas as a fuel.

For example, there are certain challenges associated with variabilities inherent in landfill gas and landfills generally. Biogas pressure may be irregular, varying over time with local environmental and seasonal conditions. Additionally, pressure and other characteristics of landfill gas may be affected by the heterogeneous and variable composition of the organic constituents of a given landfill from which the biogas arises. These issues may affect the reliability or the consistency of generators that use the biogas to generate electricity.

Hence, natural gas wells may be stranded or underutilized due to technical challenges associated with landfill gas. Indeed, millions of dekatherms of biogas and natural gas are either flared or vented at landfills and oil or gas basins every year. If a technical solution could be developed to effectively address the aforementioned technical issues, it would represent a significant advance in the state of the art.

SUMMARY

The appended claims may serve as a summary of the invention.

DETAILED DESCRIPTION

Figure 1:
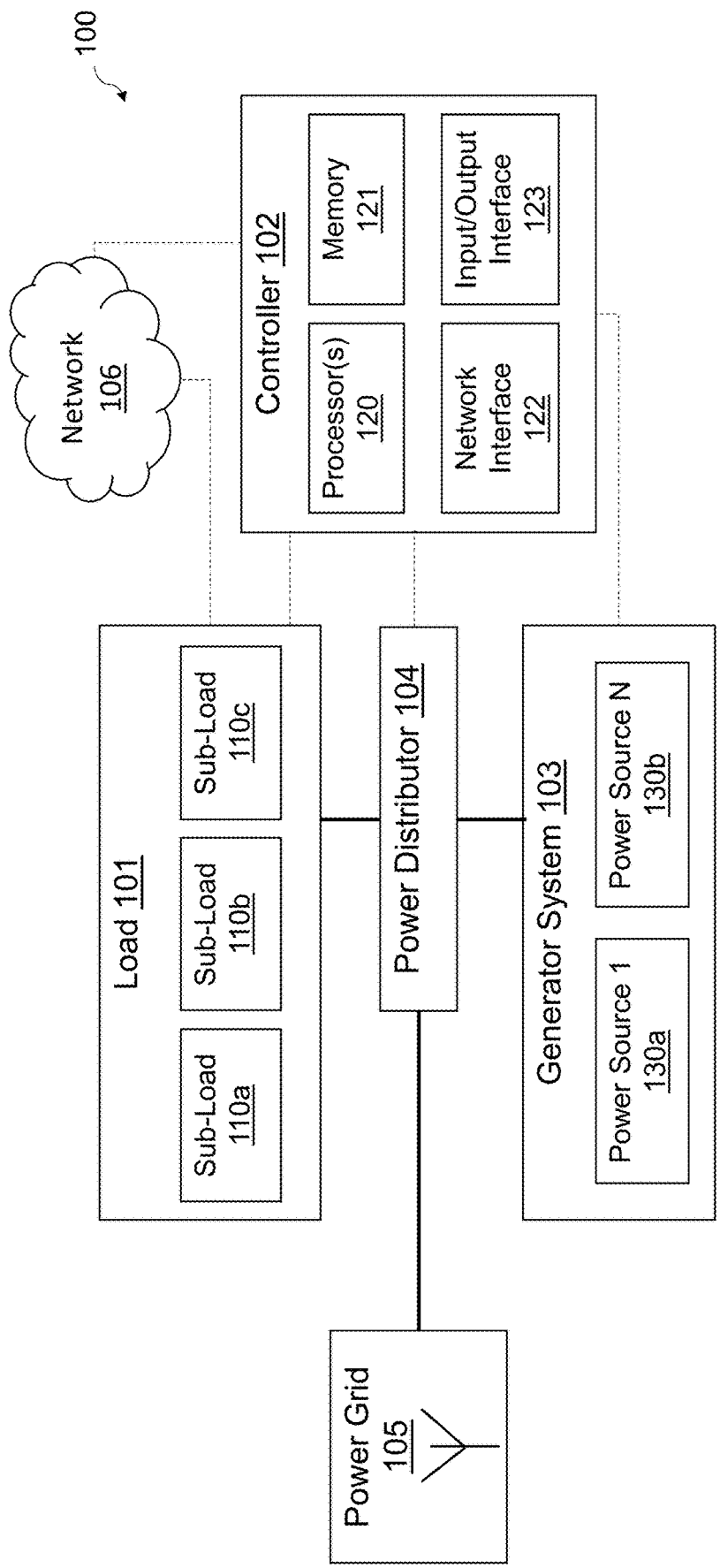
FIG. 1 illustrates the context of use and principal functional elements with which one embodiment of the disclosed technology could be implemented.

In the following description, for the purposes of explanation, numerous specific details are set forth to provide a thorough understanding of the present invention. It will be apparent, however, that the present invention may be practiced without these specific details. In other instances, wellknown structures and devices are shown in block diagram form to avoid unnecessarily obscuring the present invention.

The text of this disclosure, in combination with the drawing figures, is intended to describe in prose various embodiments of the disclosed technology, at the same level of detail that is used by people of skill in the arts to which this disclosure pertains to communicate with one another. That is, the level of detail set forth in this disclosure is the same level of detail that persons of skill in the art normally use to communicate with one another to implement the inventions claimed herein.

Embodiments are described in sections below according to the following outline:
1. General Overview
2. Structural Overview
3. Functional Overview
4. Benefits and Improvements 1. General Overview In one embodiment, the disclosed technology involves a system having a generator set comprising a first engine and an output terminal coupled to a power distributor, a load comprising two or more sub-loads, wherein each of the sub-loads is coupled to the power distributor via one or more respective electrical contactors, and a controller communicably coupled to the electrical contactors and the generator set comprising a processor and a memory—the memory having computer-readable instructions stored thereon that, when executed by the processor, cause operations. The operations may include determining several sub-loads available, receiving data representing power generation of the generator set, determining which of the available sub-loads to connect to balance the generator set to the load, and controlling the respective electrical contactors of the determined sub-loads to provide electricity to the determined sub-loads.

2. Structural Overview

FIG. 1 illustrates the context of use and principal functional elements with which one embodiment of the disclosed technology could be implemented. FIG. 1 illustrates only one of many possible arrangements of components configured to execute the functions described herein. Other arrangements may include fewer or different components, and the order of the components may be different in other embodiments. Electro-mechanical components for electrical connections, power distribution, and sensor arrangements may differ. Moreover, in various embodiments, one or more sets of system components may be combined into one or more respective integral units or mounted together on one or more modular units.

Figure 2:
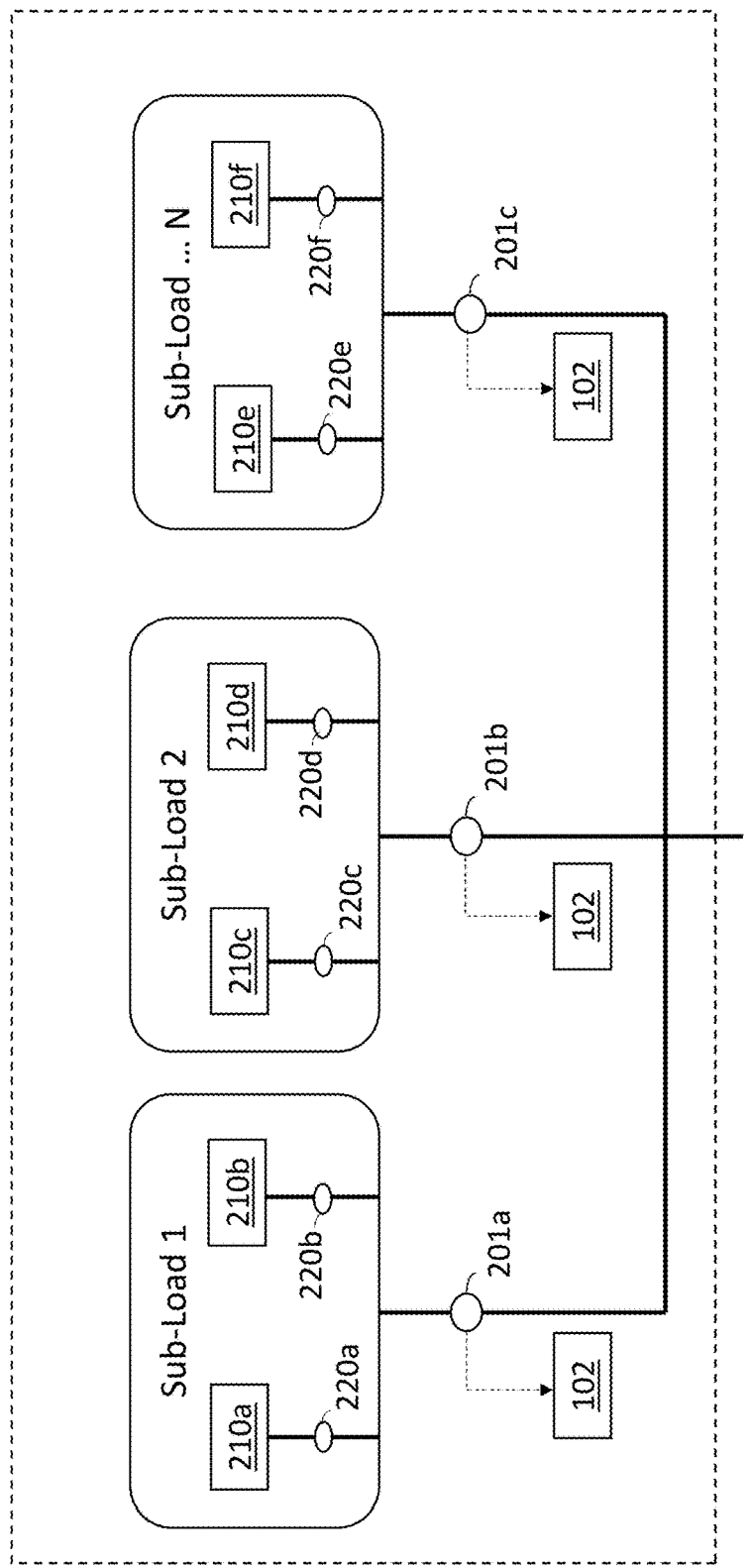
FIG. 2 illustrates a data center with which one embodiment of the disclosed technology could be implemented.

In one embodiment, a system 100 includes a load 101, a controller 102, a generator system 103 (e.g., a generator set, a bio-gas fueled power generator, etc.), and a power distributor 104. In an embodiment, the load 101 includes one or more sub-loads 110a-c that are selectively coupled to a power source via the controller 102. For example, the load 101 may include a data center and the sub-loads 110a-c may be compartmentalized portions of the data center that are selectively coupled to power based on one or more conditions determined by the controller 102. FIG. 2 illustrates a data center 200 with which one embodiment of the disclosed technology could be implemented. In some embodiments, the load 101 may be comprised of a data center and other load devices as described herein. In an embodiment, the system 100 may be considered a grid-connected system when the system 100 is coupled to a power grid, for example, via one or more substations of the power grid.

In some embodiments, the power distributor 104 may be connected to a power grid 105 such as a utility grid, a micro-grid, a local multiutility grid, and so on. The power grid 105 may be managed by a grid operator that is affiliated with a different entity. For example, the grid operator may be a manager that ensures the reliable delivery of electricity to consumers, businesses, and industries interconnected to the power grid 105. In some embodiments, the grid operator may have one or more computer devices connected to the network 106 that monitor the status of the power grid and communicate with the computer devices of nodes connected to or configured to be connected to the power grid 105 via the network 106. In one example, the computer devices of the grid operator may communicate with the controller 102.

2.1 Load

As discussed above, the load 101 may include various types of loads such as computers, industrial or commercial equipment, charging stations, storage devices, or the like. In an embodiment, the load 101 includes a data center 200 as illustrated in FIG. 2. In various embodiments, data center 200 may accommodate a combination of computing devices and infrastructure, including, racks, servers, storage devices, networking apparatus, power supplies, batteries or other backup power equipment, cooling equipment, fire suppression or other safety equipment, security or access equipment, and the like. In one embodiment, one or more separate support containers that house cooling equipment or other infrastructure may also be deployed alongside the data center 200. In one embodiment, network connectivity is built into the data center 200.

In an embodiment, data center 200 operates on network 106. Network 106 broadly represents any combination of one or more data communication networks (including local area networks, wide area networks, internetworks, or internets) using any wireline or wireless links, including terrestrial or satellite links. The network(s) may be implemented by any medium or mechanism that provides for the exchange of data between the various elements of the data center 200 and controller 102 as described herein. In an embodiment, the data center 200 includes one or more containerized data centers.

The data center 200 may be portioned out into various sub-loads 202a-n that are configured to be connected to power via respective electrical contactors 201a-n. For example, the electrical contactors 201a-n may be communicably coupled to the controller 102 such that the controller 102 can operate the electrical contactors 201a-b individually to selectively couple the respective sub-load 202a-n to electrical power. In an embodiment, the electrical contactors 201a-d include a control connection (e.g., terminals) coupled to the controller 102, an input terminal(s) connected (indirectly or directly) to a power source (e.g., directly or indirectly to the output terminals of the generator system 103), and an output terminal(s) connected to an input terminal(s) of the respective sub-load. As one example, the electrical contactor 201a may include a Sunlec controls 3 pole 220-volt (V) 240V coil 60-amp contactor or the like.

In some embodiments, the sub-loads 202a-n may include portions of the data center 200 that are partitioned based on the load size of the sub-loads 202a-n. For example, each sub-load 202a-n may correspond to a 50 kilowatt (KW) electrical load. As another example, each sub-load 202a-n may have a corresponding electrical load unique to each sub-load that is determined by or programmed into the controller 102. In this way, the controller 102 may be able to dynamically determine the operations necessary to bring each sub-load 202a-n online to maximize the load without overloading the system. Similarly, the controller 102 may be able to dynamically determine the operations necessary to turn off portions of the data center 200 while maximizing the efficiency of the generator system 103.

The various elements of data center 200 may also have direct (wired or wireless) communications links. The computers of data center 200, computing devices, and other communicatively coupled system elements may each comprise an interface compatible with the network 106 and may be programmed or configured to use standardized protocols for communication across the networks such as TCP/IP, Bluetooth, or higher-layer protocols such as HTTP, TLS, and the like. Moreover, the devices of the data center 200, such as the electrical contactors, breakers, fuses, and sensors associated therewith may be communicably coupled to the controller 102, which may be able to monitor or control.

In some embodiments, one or more of the sub-loads may include one or more computing devices 210a-210f being programmed to execute at least one of: hosting a distributed ledger, mining a cryptocurrency, staking the cryptocurrency, or validating the cryptocurrency, or hosting a cloud computing application. In various embodiments, the computing devices 210a-210f of data center 200 may execute programmed instructions formatted to cause the execution of transactions on the ETHEREUM, BITCOIN, or BITCOIN CASH blockchains, or on another blockchain, public or private. In embodiments, the computing devices 210a-210f of data center 200 execute programmed instructions formatted to cause the mining of a cryptocurrency such as ETHEREUM (ETH), BITCOIN (BTC), BITCOIN CASH (BCH), CARDANO (ADA), BINANCE COIN (BNB), LITECOIN (LTC), TETHER (USDT), SOLANA (SOL), DOGECOIN (DOGE), POLKADOT (DOT), USD (USDC), or another cryptocurrency or crypto token Additionally or alternatively, one or more of the sub-loads may also include one or more cooling devices (e.g., cooling fans, liquid cooling system, etc.) that are configured to cool the respective computing devices 210a-210f or other load devices.

In an embodiment, the computing devices 210a-210f being programmed for mining a cryptocurrency or executing transactions on a blockchain has several technical advantages. One technical advantage is that the load presented to the biogas-fueled power generator 301, albeit variable, may be relatively predictable and scalable/adjustable. Moreover, the sub-loads allow for the system to selectively activate (e.g., connect to power) different portions of the data center based on a forecasted power output by the generator, which ensures that the load is efficiently balanced not only with the generator system but also the power grid, if needed.

Another technical advantage is that sub-loads 202a-n configured to execute operations on a blockchain allow for the controller 102 to dynamically connect and disconnect power to various sub-loads nearly instantaneously without concern of whether data will be lost. For example, because blockchain transactions may occur on a publicly accessible, immutable ledger, after the sub-load is re-connected to the power source, the computing devices of the data center 200 may be programmed to easily resume operations with no loss of critical data. These are important advantages because renewable energy is inherently volatile, and conditions may change quickly, thus the amount of power supplied or capable of being supplied to the data center 200 may be relatively volatile or irregular. Thus, having a unique structure to the data center 200 allows for the controller 102 to dynamically balance power loads based on the available energy and, in some embodiments, accommodate requests from the grid operator to ensure stabilization and harmonization both within the internal system and on the utility grid without the risk of losing critical data, which is discussed in additional detail below.

In some embodiments, the ability to dynamically control the load 101 (e.g., the data center 200) via the electrical contactors 201a-d allows for the controller 102 to be able to balance the load efficiently and effectively with the output power of the generator system 103, thereby reducing the possibility of needing to flare off methane gas, which improves the sustainability of both the system and climate. In various embodiments, the sub-loads 110a-110c may include the portions of the data center 200 and other loads such as battery storage devices, battery charging devices such as electric vehicle chargers, or other types of electrical loads. For example, in some embodiments, the sub-loads 110a-110c may include battery storage systems that the controller 102 is able to selectively couple to the power source when there is excess energy being generated.

2.2 Generator System

The generator system 103 is communicably coupled to the controller 102 in a manner that allows for the controller 102 to monitor the generator system 103. For example, the generator system 103 may include various output terminals and/or a local processor (e.g., a microprocessor, application-specific integrated circuit, etc.) that is communicably coupled (e.g., via wired or wireless communication) to the controller 102 such that the controller 102 can monitor a status of the generator system 103. In some embodiments, the controller 102 may receive data that indicates the anticipated electrical power output of the generator system 103, for example, in an upcoming period. The upcoming period may be 1 minute, 2 minutes, 5 minutes, 5-45 minutes and so on. In some embodiments, the generator system 103 may have various sensors configured to measure inputs to the generator system 103 that can be used, either by the generator system 103 or controller 102, to calculate the anticipated power output of the generator system 103. In other embodiments, the generator system 103 and/or controller 102 may also receive information via the network 106 to receive data regarding environmental conditions such as weather forecasts to also calculate or determine the anticipated power output of the generator system 103.

Figure 3:
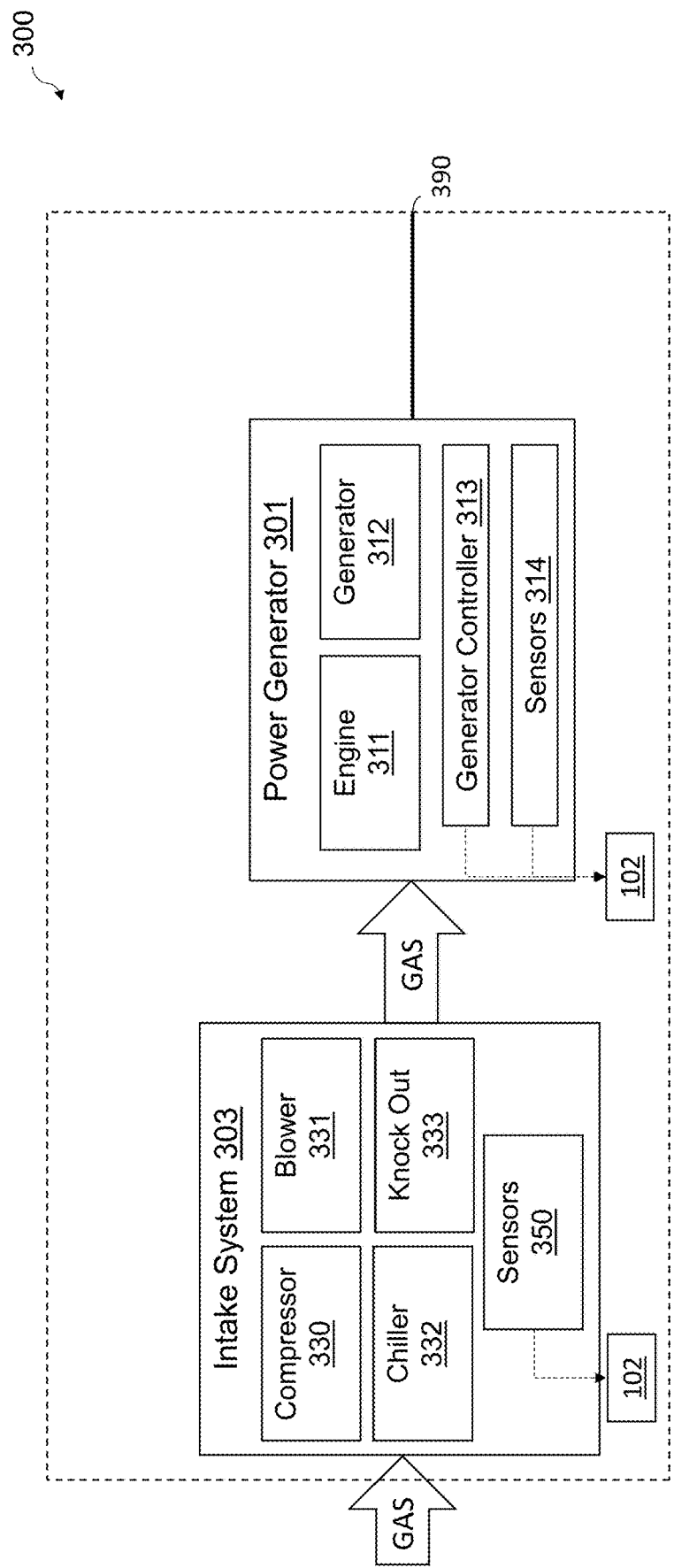
FIG. 3 illustrates a generator system with which one embodiment of the disclosed technology could be implemented.

The generator system 103 includes at least one power source 130a-130b. In some embodiments, the power source may include one or more of a low British thermal unit (Btu) gas engine, biogas engine, nuclear reactor, natural gas engine, geothermal system, solar system, solar system with batteries, wind turbines, hydrogen system (e.g., hydrogen fuel cells) compressed air, or another source that can be dispatchable through inputs of fuel (or environmental commodity such as wind) to drive a prime mover for the generation of electricity. FIG. 3 illustrates a generator system 300 with which one embodiment of the disclosed technology could be implemented. The generator system 300 of FIG. 3 includes one or more biogas engines and generators as power sources that are configured to receive biogas (e.g., gas produced from a landfill) and output electricity. However, as noted above, in other embodiments, the power source(s) may include a variety, or combination, of power sources 130a-130b.

The generator system 300 includes a biogas-fueled power generator 301 and an intake system 303. The biogas-fueled power generator 301 includes an engine 311 structured to receive biogas as an input to generate torque to power a first generator 312 (e.g., a first mover) to output electrical power. The biogas-fueled power generator 301 and the intake system 303 include a variety of sensors that are configured to sense a condition and output an electrical signal representative of the sensed condition. The electrical signal is then sent to the controller 102 for further processing as discussed in further detail below. In various embodiments, the generator system 300 may include two or more biogas power generators.

In an embodiment, the biogas-fueled power generator 301 includes one or more terminals that are communicably coupled to the controller 102 via wired or wireless connections. As an example, the biogas-fueled power generator 301 may include a plurality of terminals that are wired to respective terminals of the controller 102 that output respective electrical signals to indicate the status of the biogas-fueled power generator 301. For example, the electrical signals may be generated via sensors 314 and/or the generator controller 313. The signals may include a status of one or more emergency devices or buttons (e.g., triggered or cleared), a fault condition of the generator, a run status of the generator, a fault condition of one or more devices of the generator, an electrical trip of the generator, a gas analyzer fault of the generator, an HH level of the generator, a LL level of the generator, or other conditions associated with the operation of the engine of the generator.

The intake system 303 may include a blower skid. The blower skid is structured to receive gas coming in (e.g., from a source such as a landfill), knock out the moisture of the gas via one or more vessels in a knockout system 333, compress the gas via a compressor 330, cool the gas via an aftercooler or chiller 332, and output the gas into an intake of the biogas-fueled engine of the power generator 301 via a blower 331. In this example, the intake system 303 includes various sensors 350 that are configured to measure a condition of the intake system 303 and output an electrical signal representing the respective condition to the controller 102 for further processing. The various sensors 350 may output the electrical signal representing the condition directly to the controller 102 or may output the electrical signal to a local computer processor (e.g., a microprocessor, application specific integrated circuit, etc.) that serves as an intermediary between the sensors 350 and the controller 102.

As one example, the intake system 303 may include one or more sensors or devices 350 that output an electrical signal representative of a speed of the blower, a speed of the after cooler, the blower suction temperature, blower discharge temperature (e.g., temperature of the gas being output to the engine), NDE temperature, blower temperature, vibration of the skid, blower skid discharge temperature, blower suction press, discharge pressure, discharge flow, recycle valve position, after cooler fan speed, and so on. In various embodiments, the intake system 303 may also include one or more gas analyzer devices that are configured to output an electrical signal that indicates an amount of methane within the gas and an amount of oxygen within the gas to the controller 102 either directly or indirectly. All of these or a combination of these outputs, such as the amount of methane within the gas, the flow speed of the gas, and/or the amount of oxygen within the gas may be used by the controller 102 to calculate an anticipated amount of power that the generator will be able to output in a particular upcoming period. Additionally or alternatively, the controller 102 may send feedback to the intake system 303 to change operations to either maximize or optimize the devices of the intake system 303 to output an optimized power level based on the received data.

The power generator 301 may have a plurality of electric power output terminals 390 through which electricity may flow to the load 101 either directly or indirectly via the power distributor. In some embodiments, the plurality of electric power output terminals 390 may include sensors that are structured to measure the current, voltage, and/or electrical power output of the generator 301 and signal the data to the controller 102. In one embodiment, the load 101 is electrically coupled to the plurality of electric power output terminals 390 via an electrical coupling comprising three-phase delta wiring and through a three-phase electrical panel. The power distributor 104 may intermediate the interconnection of the load 101 (e.g., data center 200) with the output terminals 390 of the biogas-fueled power generator 301 by regulating an amperage and voltage drawn through the three-phase delta wiring. The biogas-fueled power generator 301 may have an internal computer (e.g., a microprocessor, application-specific integrated circuit, etc.) 313 that regulates current and/or voltage output. In one embodiment, no neutral is needed for powering the data center 200 because the load 101 is stable. In other embodiments, Wye wiring may be used instead.

In one embodiment, the biogas-fueled power generator 110 is configured to operate at 60 Hz and 480V and to provide a power output in a range of 800 to 2500 kVA. One known commercial example of a biogas-fueled power generator 110 is the G3520C Continuous Low Energy Gas Generator Set manufactured by CATERPILLAR INC. of Deerfield Illinois, but many others are possible. In various embodiments, the biogas-fueled power generator 301 does not comprise a catalytic converter.

In one embodiment, the biogas-fueled power generator 301 is configured to operate at 480V or more and is electrically connected to a transformer that steps down the operating voltage to 240V. In some embodiments, the transformer may be part of the generator system 103 or the power distributor.

2.3 Controller

The controller 102 may include one or more processors 120, a memory device 121, a network interface 122, and an input/output interface 123. In some embodiments, the input/output interface 123 may have one or more terminals structured to be wired to the various sensors and devices of the generator system 103 and the load 101 to monitor the status thereof. Additionally or alternatively, the controller 102 may include one or more terminals structured to electrically and mechanically couple to the electrical contactors 201a-n of the sub-loads to monitor the status of the electrical contactors and/or individually control each of the electrical contactors.

The one or more processors 120 can include a microprocessor, programmable logic controller (PLC) chip, an ASIC chip, or any other suitable processor. The one or more processors 120 may take the form of a single core processor, multi-core processor (e.g., a dual core processor, triple core processor, quad core processor, etc.), etc. In some embodiments, the one or more processors 120 may be external to the system, for example the one or more processors 120 may include a remote processor (e.g., a cloud-based processor). Alternatively or additionally, the one or more processors may be internal and/or local to the apparatus. In this regard, a given component of the controller 102 may be disposed locally (e.g., as part of a local server, a local computing system, etc.) or remotely (e.g., as part of a remote server such as a cloud-based server).

The memory device 121 includes any of the memory and/or storage components discussed herein. For example, memory device 121 may include RAM and/or cache of the processor. The memory device 121 may also include one or more storage devices (e.g., hard drives, flash drives, computer-readable media, etc.) either local or remote to controller 102. The memory device 121 is structured to store historical data of data received via the network 106, the generator system 103, and the load 101. Moreover, the memory device 121 is structured to store non-transitory computer-readable instructions that, when executed by the one or more processors, cause the controller 102 to perform the various operations described herein. For example, the operations may include monitoring the status of the generator system 103 (e.g., via the received signals), monitoring the status of the load 101, opening and closing the electrical contactors 201*a*-*d*, calculating or determining the anticipated power output of the generator system 103 based on the monitored or received data, sending/receiving data via the network interface and network 106, and so on.

The network interface 122 is structured to allow the controller 102 to communicate via network 106. The network interface 122 may include wired interfaces such as serial interface terminals, ethernet terminals, and so on. In some embodiments, the network interface 122 includes wireless network components such as antennas and/or chips that allow the controller 102 to communicate via the network 106 via a wireless local area network (WLAN), Bluetooth connection, cellular network, or the like. In some embodiments, the network interface 122 is configured to execute one or more application programming interfaces (APIs) to establish network connections with personal devices of administrators, with computing devices of a grid operator, and/or other computing devices connected to the power grid 105.

In some embodiments, the controller 102 may include one or more displays coupled to the one or more processors. For example, the controller 102 may include a human-machine interface (HMI) such as a touch screen that is configured to display portions of the monitored data, the status of the systems, and/or allow for manual changes to be implemented. Alternatively or additionally, a user may use a personal device such as a cellular device, tablet, personal computer, or the like to remote into the controller 102. Remoting into the controller 102 allows the personal device to have access to the information monitored, see the graphical user interfaces generated by the controller 102, manually give the controller 102 commands, and/or program the controller 102 to perform one or more of the operations described herein.

Figure 6:
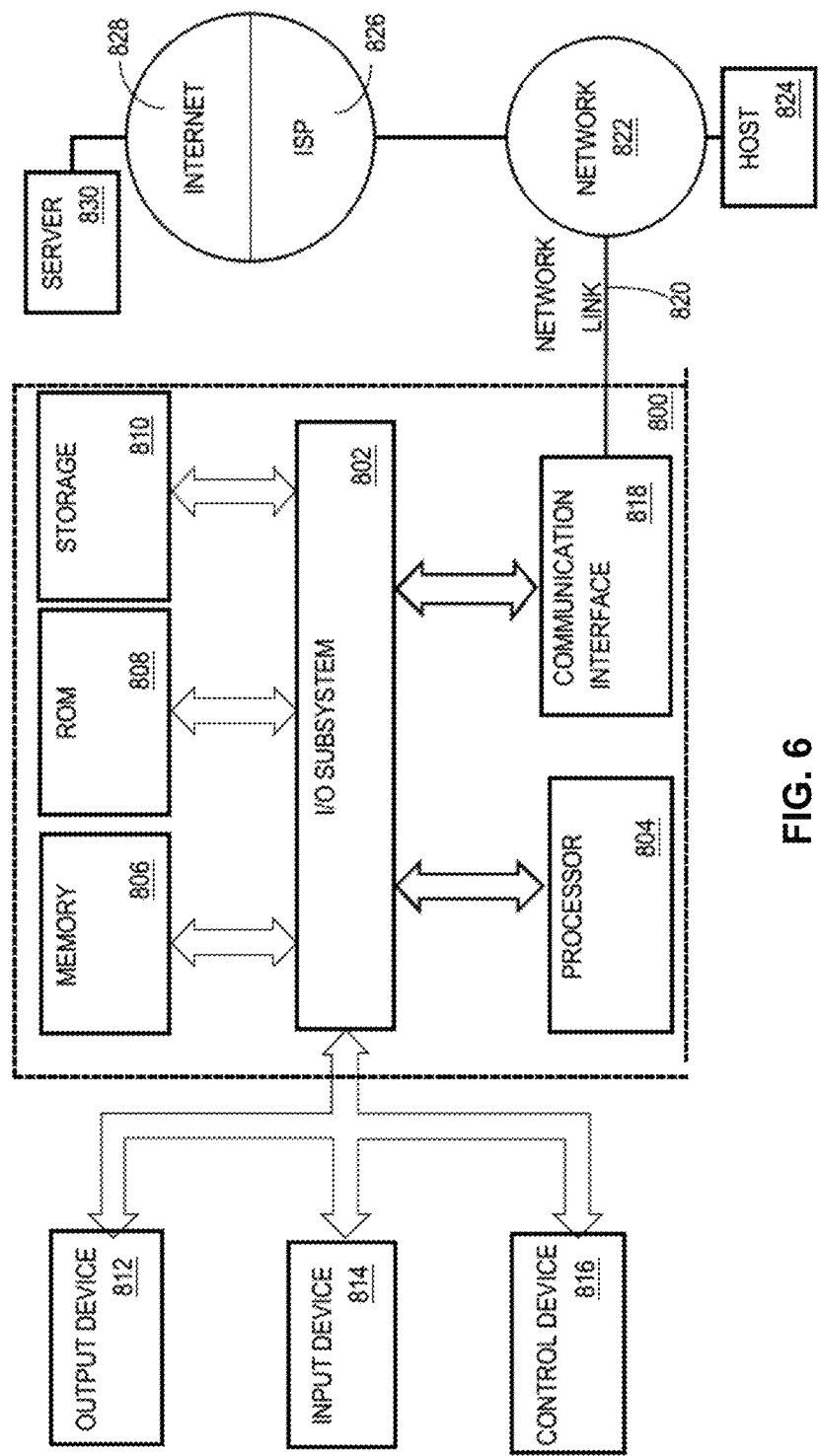
FIG. 6 illustrates a second method of operating the principal functional elements of the system which one embodiment of the disclosed technology could be implemented.

FIG. 6 illustrates an example implementation of the controller of FIG. 1. According to one embodiment, the functional techniques described herein are implemented by at least one computing device such as controller 102. The techniques also may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 800 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations. Elements of the computer system 800 can implement controller 102.

Computer system 800 includes an input/output (I/O) subsystem 802, which may include a bus and/or other communication mechanism(s) for communicating information and/or instructions between the components of the computer system 800 over electronic signal paths. The I/O subsystem 802 may include an I/O controller, a memory controller, and at least one I/O port. The electronic signal paths are represented schematically in the drawings, such as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU), or a digital signal processor or ARM processor. Processor 804 may comprise an integrated arithmetic logic unit (ALU) or be coupled to a separate ALU.

Computer system 800 includes one or more units of memory 806, such as a main memory, coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during the execution of instructions to be executed by processor 804. Such instructions, when stored in non-transitory computer-readable storage media accessible to processor 804, can render computer system 800 into a special-purpose machine customized to perform the operations specified in the instructions.

Computer system 800 includes non-volatile memory such as read-only memory (ROM) 808 or other static storage devices coupled to I/O subsystem 802 for storing information and instructions for processor 804. The ROM 808 may include various forms of programmable ROM (PROM), such as erasable PROM (EPROM) or electrically erasable PROM (EEPROM). A unit of persistent storage 810 may include various forms of non-volatile RAM (NVRAM), such as FLASH memory, solid-state storage, magnetic disk, or optical disks such as CD-ROM or DVD-ROM and may be coupled to I/O subsystem 802 for storing information and instructions. Storage 810 is an example of a non-transitory computer-readable medium that may be used to store instructions and data which, when executed by the processor 804, cause performing computer-implemented methods to execute the techniques herein.

The instructions in memory 806, ROM 808, or storage 810 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 800 may be coupled via I/O subsystem 802 to at least one output device 812. In one embodiment, output device 812 is a digital computer display. Examples of a display that may be used in various embodiments include a touchscreen display, a light-emitting diode (LED) display, a liquid crystal display (LCD), or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections, or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. The control device 816 may be a touchpad, a mouse, a trackball, or cursor direction keys for communicating direction information and command selections to processor 804 and for controlling cursor movement on an output device 812, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 814 may include a combination of multiple input devices, such as a video camera and a depth sensor.

In another embodiment, computer system 800 may comprise an Internet of Things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders, and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware, and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 802.

Transmission media can also be acoustic or light waves generated during radio-wave and infrared data communications.

Various forms of media may carry at least one sequence of at least one instruction to processor 804 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to a bus or I/O subsystem502. Communication interface 818 provides a two-way data communication coupling to a network link(s) 820 directly or indirectly connected to at least one communication network, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may connect through network 822 to a host computer 824.

Furthermore, network link 820 may connect through network 822 or to other computing devices via internetworking devices and/or computers operated by an Internet Service Provider (ISP) 826. ISP 826 provides data communication services through a worldwide packet data communication network called Internet 828. A server computer 830 may be coupled to Internet 828. Server computer 830 broadly represents any computer, data center, virtual machine, or virtual computing instance with or without a hypervisor, or computer executing a containerized program system such as DOCKER or KUBERNETES. Server computer 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, a server farm, or other organizations of computers that cooperate to perform tasks or execute applications or services. Server computer 830 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer, and data storage layer, such as a relational database system using a structured query language (SQL) or no SQL, an object store, a graph database, a flat file system or other data storage.

Computer system 800 can send messages and receive data and instructions, including program code, through the network(s), network link 820, and communication interface 818. In the Internet example, server computer 830 might transmit a requested code for an application program through Internet 828, ISP 826, local network 822, and communication interface 818. The received code may be executed by processor 804 as it is received and/or stored in storage 810 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

2.4 Power Distributor

The power distributor 104 is structured to allow the control of the flow of power from the system 100 internally among the various elements and externally to the power grid 105. For example, the power distributor 104 may include one or more transformers, automatic transfer switches (ATS), electrical contactors, fuses, relays, electrical panels, and so on. The power distributor 104 may include a first set of terminals structured to electrically and mechanically connect to the power grid 105, a second set of terminals structured to electrically and mechanically connect to the output terminals of the generator system 103, and a third set of terminals structured to electrically and mechanically connect to the load 101.

Moreover, the power distributor 104 is communicably coupled (e.g., either directly or indirectly) to the controller 102 such that the controller 102 can send commands to the power distributor or otherwise control the operations of the components therein. For example, the controller 102 may send commands that cause the power distributor 104 to connect or disconnect to the power grid 105 (e.g., via an ATS). As another example, the controller 102 may monitor the power sent to the power distributor from the generator system 103.

In some embodiments, the power distributor 104 may include various components that are spread throughout a facility. That is, the components of the power distributor 104 need not be all localized in a single area. Rather, the structure of the power distributor 104 may be in any configuration that allows for the selective interconnection of electrical power between the load 101, the generator system 103, and/or the power grid 105 in accordance with the operations described herein.

3. Functional Overview

The preceding section has described the complete structure of an example power generation system 103 and a load 101 comprising multiple sub-loads 110a-c. The same structural elements as described in the preceding section also can be utilized in a method of operating the power generation system 103 to optimize the system and reduce the amount of waste. As indicated above, the operations described with reference to each method may be implemented via the execution of the non-transitory computer-readable instructions by the one or more processors of the controller 102. The operations described for each method are meant to be exemplary and are not limited to a particular order nor confined to a particular implementation. For example, a combination of the operations described with reference to a first method may be performed concurrently or interconnectedly with operations described with reference to a second method.

Figure 4:
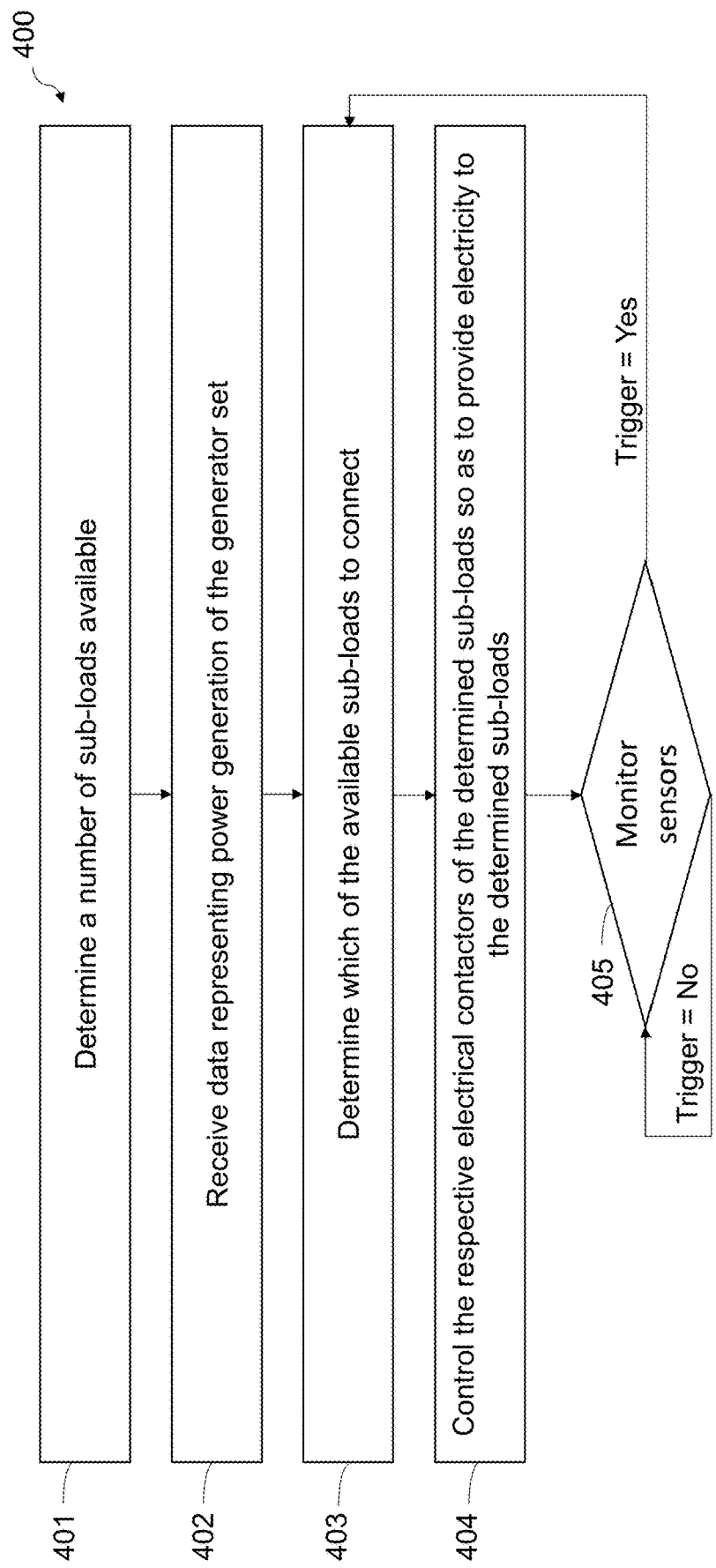
FIG. 4 illustrates a first method of operating the principal functional elements of the system by which one embodiment of the disclosed technology could be implemented.

FIG. 4 illustrates a first method 400 of operating the principal functional elements of the system by which one embodiment of the disclosed technology could be implemented. For example, first method 400 includes monitoring the status of the electrical capacity of the generator system to dynamically control the load 101 to optimize the power usage of the generator system and reduce potentially harmful waste.

In an operation 401, the controller 102 determines the number of sub-loads that are available. In some embodiments, the controller 102 is manually programmed with data (e.g., within a variable) that indicates the number of sub-loads that are part of the load 101. For example, the controller 102 may be programmed with information (e.g., within objects or within a look-up table) that the load 101 is a particular electrical load size (e.g., 500 kW) and that there are ten (10) sub-loads of the load 101 that are each connected to the power source via a respective electrical contactor 201a-n. In some embodiments, the sub-loads are of equal size (e.g., 50 kW). In some embodiments, the sub-loads may each have different sizes (e.g., 10 KW, 50 KW, etc.). In an embodiment, the controller 102 can reference which electrical contactor 201a-n is connected to each particular sub-load. For example, the controller 102 may have a look-up table or map stored that correlates each sub-load to a particular electrical contactor (or set of contactors) 201a-n and/or correlates the communication addresses of each device within the sub-loads to the particular electrical contactor 201a-n. In some embodiments, the electrical load size of each of the sub-loads may be stored in a reference table.

Alternatively or additionally, the controller 102 may be able to dynamically determine the electrical load size of each of the sub-loads and/or update the reference table based upon the dynamic determination. As one example, the controller 102 may receive signals from respective monitoring devices/sensors structured to measure the voltage, amperage, and/or power flow of the respective sub-load to determine an average power and/or peak power consumed by the particular sub-load when connected to power. That is, the controller 102 may be configured to store the historical data of the power usage corresponding to each of the sub-loads and reference that data to calculate or estimate the electrical power load of the respective sub-load.

As another example, the controller 102 may be communicably coupled to one or more contactors, contacts, fuses, or breakers connected in parallel within the sub-load and determine the anticipated electrical power load based on the number. For example, a sub-load may have ten (10) or more breakers 220a-f connected in parallel within a sub-load 202a-n that can each handle a particular amperage. The breakers may be communicably coupled to the controller 102 such that the controller is able to monitor the status of the breaker and/or control the status of the respective breaker 220a-f. The controller 102 may then be able to calculate or estimate, based on the number of breakers in parallel, the status of the breakers, and the size of each of the breakers, the total electrical power load of the sub-load.

As another example, the controller 102 may receive a fault signal from one or more of the electrical contactors 201a-b that indicates the to the controller 102 that the sub-load corresponding to the faulted electrical contactor is not available to be connected to the power source. In response, the controller 102 may flag that particular sub-load, disconnect all electrical contactors to that sub-load, and/or generate a message to an administrator or operator of the system. In various embodiments, the message may include an alarm located on the controller, an alarm on a display (e.g., HMI) of the controller 102, an automatically generated e-mail or text message, and so on.

In an operation 402, the controller 102 receives data representing the power generation output of the generator set. In an embodiment, the data may be received in real time or near real time and the data may represent a then-current power generation output of the generator set. In some embodiments, the controller 102 receives information regarding a status of the generator system 103 that represents the power generation output of the generator set. For example, the controller 102 may receive electrical signals from one or more devices and sensors of the generator system 103 that indicate the number of generators running, faulted, or off, the engine speed of each engine, the oxygen and methane content of the gas being input into the generator engines (e.g., characteristics of the gas to be input to the engine of the generator system), and the output of electricity from the generator. The controller 102 may monitor this data over time and store this data to create predictive models of the electrical output of the generator system 103 based on the sensed conditions. The power generation output (e.g., anticipated power output and/or power output limits) may be estimated via a machine learning model using the received data as inputs, calculated using one or more equations using the received data as inputs, or determined based on other operations such as a look-up table of historical information of the received data and respective electrical output or a pre-programmed look-up table of the received data and respective electrical output.

In some embodiments, the controller 102 may monitor data from devices/sensors on the intake system 303 of the generator system such as the landfill gas blower skid including blower motor speed, methane content, gas flow, aftercooler temperatures, and other vital data points to optimize the flow of landfill gas into the blower skid and out into the biogas generator. The controller 102 may execute one or more operations that cause the operation of the devices of the intake system (e.g., blower speed, temperature setting, compressor speed, and so on) to optimize the power output of the generator system 103. For example, the controller 102 may monitor the data from the devices/sensors on the intake system 303 and cause the compressor to speed up if the methane content of the gas falls below a threshold (e.g., falls below 40%). The controller 102 may send these commands back to the intake system 303 to implement the command and the controller 102 can then estimate or anticipate the power generation of the generator system 103 based on the new settings of the generator system 103 (e.g., new settings of the compressor) and the sensed conditions of the gas used by the engines in the generator system 103. In this way, the controller 102 can optimize the composition of fuel into the engine via controlling the blower skid devices and thereby the output of electricity from the generator end of the engine.

In some embodiments, the controller 102 may monitor data from devices/sensors of the generator engines of the generator set such as the engine speed, engine on/off, engine trip, characteristics of the gas to be input into the engine such as oxygen, methane content, gas flows and other vital data points to optimize the input of fuel into the engine and the output of electricity from the generator end of the engine 311. For example, the data received from the devices and/or sensors installed on the generator engines allow for the controller to determine the current status of the engines including the composition and flow of fuel into the engines. This allows the controller 102 to estimate the almost immediate output horsepower of the engine and thereby the resulting electrical power output of the generator system.

In an operation 403, the controller 102 determines which of the available sub-loads to connect. For example, the controller 102 may match the electrical output and the anticipated electrical output to an equal (or lesser) load by determining which of the available sub-loads to connect. In some embodiments, the controller 102 may take the electrical output and the anticipated electrical output of the generator system 103, apply a margin of safety such as 80%, 90%, 95%, or like the anticipated electrical output of the generator system 103 and then determine which of the sub-loads should be connected to optimally balance the load and the generator system 103.

In some embodiments, the sub-loads may have a priority associated with each of the sub-loads. For example, if there are ten (10) sub-loads, the first sub-load may have the highest priority of three (3) and the other sub-loads may have a lower priority of two (2). In this example, the sub-load with the highest priority (e.g., the first sub-load) will be determined to be connected first and the other sub-loads may be added in a particular order (e.g., sequentially) until the load is balanced with the output of the generator 301. In another example, the controller 102 may determine that a particular heavy sub-load (e.g., 50 KW) cannot be added without overloading the system and instead add a smaller sub-load (e.g., 10 KW) to balance the load as closely as possible.

In an operation 404, the controller 102 controls the respective electrical contactors of the determined sub-loads to provide electricity to the determined sub-loads. For example, the controller 102 may transmit an electrical signal that causes the respective electrical contactors 201*a-d* to turn on (e.g., electrically conduct) to connect the determined sub-loads to the electrical power supplied by the generator system 103. In some embodiments, the controller 102 may utilize a look-up table to determine which electrical contactor (e.g., via a corresponding address of an output control terminal) is to receive the command to turn on. In this way, the controller 102 can dynamically control the total size of the load 101 to optimize the power usage of the power generated by the generator system 103.

It is to be appreciated that method 400 or operations thereof may be performed recursively at set time intervals, according to a pre-set schedule, or in response to one of the monitored sensors outputting a reading that breaches (e.g., exceeds or falls below) a threshold value. That is, the controller 102 may continuously monitor the sensors of the generator system and the load 101 in operation 405. If there is a trigger, then the controller may repeat operations 403 and 404 to ensure the load is balanced and optimized. For example, the controller 102 may be configured to determine the number of sub-loads to connect based on the power generation limits of the generator set at a second time, determine which of the available sub-loads to connect, and control the respective electrical contactors of the determined sub-loads to provide electricity to the determined sub-loads. The second time may correspond to a pre-set interval from a first time where operation 402 was performed or in response to monitored data changing beyond a threshold. For example, if the methane content falls below a particular threshold (e.g., 40%) the controller 102 may be able to anticipate that the electricity output will fall by enough that requires the disconnection of the lowest priority sub-load to prevent overloading the generator and the respective faults that come along therewith. Accordingly, the controller 102 may disconnect the particular sub-load via control of the respective electrical contactors to keep the electrical load level lower than the power generated. As another example, if the controller 102 senses that the actual electrical power output falls below a calculated load level connected to the generator system 103, then the controller 102 may automatically cause one or more sub-loads to disconnect to prevent over-loading and optimally balance the load to the electrical output of the generator set.

Figure 5:
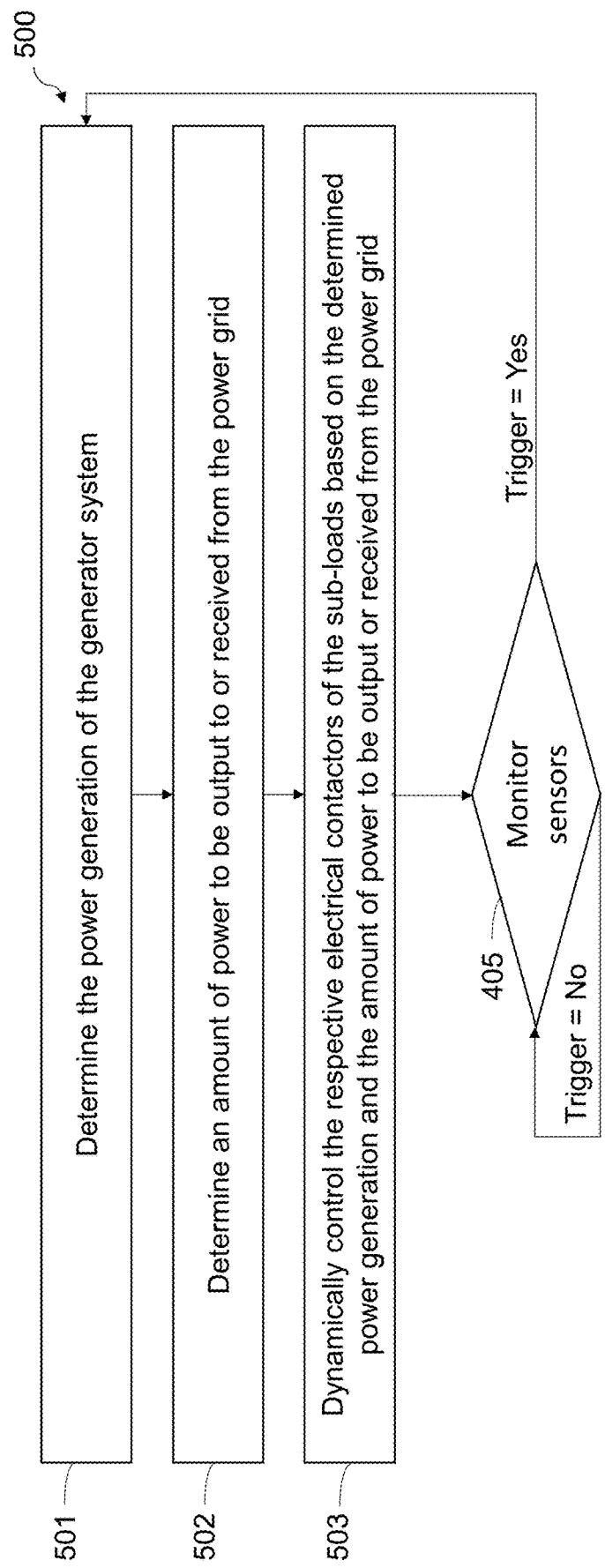
FIG. 5 illustrates a second method of operating the principal functional elements of the system which one embodiment of the disclosed technology could be implemented.

FIG. 5 illustrates a second method 500 of operating the principal functional elements of the system by which one embodiment of the disclosed technology could be implemented. For example, second method 500 includes determining the power generation limits of the generator system, determining an amount of power to be output or received from the power grid, and dynamically controlling the load 101 to optimize the power usage of the generator system and reduce waste.

In operation 501, the controller determines the power generation limits of the generator system. In some embodiments, operation 501 may be similar or the same as operation 402. For example, the controller 102 receives various signals from the generator system 103 and can determine a current electrical power output of the generator system and an anticipated electrical power output of the electrical system. In some embodiments, the controller 102 may also use data collected via network 106 to determine the power generation limits of the generator or the anticipated electrical power to be output from the generator system 103. For example, the controller 102 may receive, via an API, weather data. In an embodiment, where the generator system 103 includes wind or solar power sources, the weather data may be used to determine the anticipated electrical power output based on the anticipated wind speed or cloud cover. As one example, the controller 102 may be able to calculate the anticipated electrical power output of the wind turbines based on a pre-set equation that correlates wind speed to anticipated electrical power output. In another example, the controller 102 may reference historical data stored in the memory to correlate wind speeds (e.g., or cloud cover) to the actual power output by the system. Thus, this correlation allows for the controller 102 to estimate the anticipated electrical power based on the sensors of the generator system 103 and third-party data that includes information that will affect the electrical power output of the generator system 103.

In operation 502, the controller 102 determines an amount of power to be output or received from the power grid. In some embodiments, the system 100 is to run in an island mode. That is, no electrical power is to be received from the power grid 105 or output to the power grid 105. Rather, the generator system 103 and the load 101 will use the embodiments described herein to harmoniously optimize the efficiency of the system 100. However, in some embodiments, a grid operator may request help supporting the grid. The help requested may be in a particular message sent to the controller 102 or in a message sent to an operator that is able to provide commands to the controller to remove the controller 102 from island mode. In particular, the message may be in the form of a request to output a set amount of power to the power grid or to provide a load to the power grid to assist in stabilization of the power grid when there is too much power generation relative to the loads. In an embodiment, the controller 102 may receive signals and/or data that allows the controller to determine a status of the power grid. In an embodiment, the status may allow the controller to determine that the power grid needs a load-sink (i.e., the power grid has more power supply than demand). In response, for example, the controller 102 may respond to this determination by determining a number of sub-loads to connect to system to provide the determined load-sink and transmitting commands that cause the determined number of sub-loads to be connected to the system via the respective electrical contactors.

In some embodiments, the power grid operator may simply request via an API message to the controller 102 (e.g., from a computer of the power grid operator) that the controller 102 monitor the voltage and frequency at the terminals of the power distributor 104 and dynamically provide support to the grid in transient times. That is, the controller 102 may determine that a certain amount of power is needed to be supplied to the power grid 105 or sunk from the power grid 105 based on the monitored voltage and frequency at the terminals.

As another example, the request from the power grid operator may indirectly request support. For example, in some cases, a power grid operator may publish a set price for electricity provided to or pulled from the power grid 105. The controller 102 may retrieve the price information via an API and calculate based on that price and an estimated cost of kW hours of the generator system 103 whether to pull power from the power grid (e.g., if the price is lower than the generation cost) or put power on the power grid (e.g., if the grid operator will pay more than the cost of generating by the generator system 103). As discussed above, the controller 102 can dynamically control the load 101 via controlling the electrical contactors of the sub-loads, thus the system 100 is uniquely able to provide such support to the power grid where other power plants may not be able to in a timely manner.

In operation 503, the controller 102 dynamically controls the respective electrical contactors of the sub-loads based on the determined power generation limits and the amount of power to be output or received from the power grid. For example, once the controller 102 determines power available based on the power generation limits of the generator system 103 (e.g., the anticipated amount of electrical power) and determines the amount of power to be output to or received from the power grid, then the system can calculate whether there is excess power that needs to be consumed by the load 101 to optimize the system or whether there is not enough excess power. As one example, the controller 102 may determine that the generator system 103 going to output 300 kW of power and the grid operator needs another 200 kW of electrical power sunk from the grid for stabilization purposes in the next hour, then the controller 102 will calculate that there is 500 kW available for the load 101. The controller 102 may then determine which of the sub-loads to connect to balance the load to 500 kW. In an example where each sub-load is configured to provide an electrical load of 50 KW, then the controller 102 will connect ten (10) of the sub-loads to the power source and control the devices in the power distributor to provide the load to the power grid 105.

After the system has been balanced for a first time, the controller 102 may continuously monitor the sensors of the generator system and the load 101 in operation 405. In response to a trigger, such as a time trigger, a new request from the grid operator, or a change in one or more of the monitored sensors, the controller 102 may repeat one or more of operations 501, 502, or 503 to cause the system to rebalance. In some embodiments, the rebalancing may include disconnecting one or more of the sub-loads or connecting one or more of the sub-loads via a command sent to one or more respective electrical contactors of the sub-loads. In this way, the system and controller 102 can provide support to the power grid in times when the power grid may need additional support or when the power grid needs an extra load to maintain voltage and frequency levels.

4. Benefits and Improvements

The disclosed embodiments provide numerous benefits and improvements over prior practice. For example, a load having multiple sub-loads that are dynamically connected to power created by a generator system allows for increased efficiency of power usage even when the generator system may be unstable or volatile. This may reduce the need to flare off methane harvested from a landfill, which improves the environmental impact of landfills and biogas generators associated therewith. Moreover, the multiple sub-loads that may be selectively coupled to the power output of the generator system allow for the system to interoperate on a power grid to either provide support to the grid or provide a load to the grid to assist with the stabilization of the voltage and frequency of the power grid.

Moreover, data centers with computers programmed to execute hosting a distributed ledger, mining a cryptocurrency, staking the cryptocurrency, validating the cryptocurrency, or hosting a cloud computing application have consumed ever-increasing amounts of power as demand for these technologies and their results has increased, but the embodiments of this disclosure can use biogas sources produced from waste decomposition at landfills (or other potentially volatile power sources such as wind and solar) that are located far from inhabited areas and lacking access to power utilities, conventional power grids, substations, or transmission lines. Portioning the data centers allows for the system to optimally balance the number of computers and other equipment online, which optimizes the on-time of the system and ensures that the power generated is efficiently utilized.

Further, embodiments can use landfill gas as a fuel source, even though landfill gas is known to comprise a "dirty" mixture of volatile, naturally corrosive gases, and exits landfills with variable pressure and irregular elemental gas mixtures. As such, these irregular gas mixtures, or weather-dependent power sources, may cause the electrical power generation to be volatile or unstable. The inventors, in an inventive moment, have discovered a combination of physical equipment that solves these challenges and permits an electrically powered portioned out load that may be powered from sources that otherwise would be wasted. The structure of the present disclosure, in a significant advance in the state of the art, enables productive use of biogas from isolated locations without primarily burning biogas as waste via flaring or wasting biogas via venting.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   a generator set comprising an engine, an output terminal for outputting electrical power, and an intake blower coupled to an intake of the engine having one or more sensors configured to output data representing at least one of oxygen levels and methane content;
   a load comprising two or more sub-loads, wherein each of the sub-loads is structured to be selectively coupled to the output terminal for receiving electrical power; and
   a controller that is communicably coupled to the generator set, the controller comprising a processor and a memory, the memory storing one or more sequences of computer-readable instructions which, when executed by the processor, cause the processor to execute:
   determining a number of sub-loads within the load;
   recursively monitoring the output data from the one or more sensors;
   determining which of the sub-loads to connect to balance output power of the generator set to the load based at least on the output data from the one or more sensors; and
   controlling respective electrical connections of the determined sub-loads to provide electrical power to the determined sub-loads.

2. The system of claim 1, wherein the load is a data center, and wherein one of the sub-loads comprises a plurality of computing devices, the plurality of computing devices being programmed to execute at least one of: hosting a distributed ledger, mining a cryptocurrency, staking the cryptocurrency, or validating the cryptocurrency, or hosting a cloud computing application.

3. The system of claim 2, the memory further comprising sequences of instructions which, when executed by the processor, cause the processor to execute: receiving data representing an anticipated load of each of the sub-loads and data representing a priority of each sub-load.

4. The system of claim 1, further comprising a power distributor coupled between the output terminal and one or more of the sub-loads, wherein the power distributor is further connected to a power grid and the controller is communicably coupled to a network, the memory further comprising sequences of instructions which, when executed by the processor, cause the processor to execute: receiving data representing a status of the power grid via the network; and determining which sub-loads to connect based on the status of the power grid.

5. The system of claim 1, the memory further comprising sequences of instructions which, when executed by the processor, cause the processor to execute:
   determining a number of sub-loads to connect based on power generation limits of the generator set at a second time;
   determining which of the sub-loads to connect; and
   controlling respective electrical connections of the determined sub-loads to provide electricity to the determined sub-loads.

6. The system of claim 5, the memory further comprising sequences of instructions which, when executed by the processor, cause the processor to execute calculating based on settings data of the generator set and sensed condition of gas flow in the generator set, an anticipated power output of the generator set and optimizing a composition of fuel into the engine based on the anticipated power output of the generator set.

7. The system of claim 1, further comprising a plurality of sensors on the intake blower of the generator set that are configured to output measurements of the data representing the oxygen levels, the methane content, and gas flow of the intake to the engine.

8. The system of claim 1, the memory further comprising sequences of instructions which, when executed by the processor, cause the processor to execute disconnecting a sub-load via controlling an electrical connection to maintain an electrical load level lower than the output power of the generator set.

9. A method comprising:
   determining, via a controller, a number of sub-loads of a load that are available, wherein the load comprises two or more sub-loads and each sub-load is configured to be selectively coupled to a generator set;
   recursively monitoring, via the controller, output data representing at least one of oxygen levels and methane content from one or more sensors positioned within in an intake blower of an engine of the generator set, wherein the intake blower is coupled to an intake of the engine;

determining, via the controller, which of the available sub-loads to connect to balance output power of the generator set to the load based at least on the output data from the one or more sensors; and controlling respective electrical connections of the determined sub-loads by the controller to provide electrical power to the determined sub-loads.

10. The method of claim 9, wherein one of the two or more sub-loads comprises a plurality of computing devices, the plurality of computing devices being programmed to execute at least one of: hosting a distributed ledger, mining a cryptocurrency, staking the cryptocurrency, or validating the cryptocurrency, or hosting a cloud computing application.

11. The method of claim 10, further comprising receiving data representing an anticipated load of each of the sub-loads and data representing a type of the sub-load, wherein the type of sub-load is used to determine a priority of each sub-load.

12. The method of claim 9, further comprising receiving by the controller, data representing a status of a power grid coupled to a power distributor positioned between the generator set and one or more of the sub-loads; and determining which sub-loads to connect based on the status of the power grid.

13. The method of claim 9, further comprising:
determining a number of sub-loads to connect based on power generation limits of the generator set at a second time;
determining which of the available sub-loads to connect; and
controlling respective electrical connections of the determined sub-loads to provide electrical power to the determined sub-loads.

14. The method of claim 9, further comprising calculating based on settings data of the generator set and sensed condition of gas flow in the generator set, an anticipated power output of the generator set and optimizing a composition of fuel into the engine based on the anticipated power output of the generator set.

15. The method of claim 9, further comprising disconnecting a sub-load via controlling an electrical connection to maintain an electrical load level lower than the output power of the generator set.

16. A non-transitory computer-readable storage medium storing one or more sequences of instructions which, when executed by one or more processors, cause the one or more processors to perform:

determining, via a controller, a number of sub-loads of a load that are available to be selectively coupled to a local generator set;

recursively monitoring, via the controller, output data representing at least one of oxygen levels and methane content from one or more sensors included in an intake blower of the generator set, wherein the intake blower is coupled to an intake of an engine of the generator set;

determining, via the controller, which of the available sub-loads to connect to balance output power of the generator set to the load based at least on the output data from the one or more sensors; and controlling respective electrical connections of the determined sub-loads by the controller to provide electrical power to the determined sub-loads.

17. The non-transitory computer-readable storage medium of claim 16, wherein one of the one or more sub-loads comprises a plurality of computing devices, the plurality of computing devices being programmed to execute at least one of: hosting a distributed ledger, mining a cryptocurrency, staking the cryptocurrency, or validating the cryptocurrency, or hosting a cloud computing application.

18. The non-transitory computer-readable storage medium of claim 16, further comprising sequences of which, when executed using the one or more processors, cause the one or more processors to perform:
determining a number of sub-loads to connect based on power generation limits of the generator set at a second time;
determining which of the available sub-loads to connect; and
controlling respective electrical connections of the determined sub-loads to provide electricity to the determined sub-loads.

19. The non-transitory computer-readable storage medium of claim 16, further comprising instructions which, when executed using the one or more processors, cause the one or more processors to perform: calculating based on settings data of the generator set and sensed condition of gas flow in the generator set, an anticipated power output of the generator set and optimizing a composition of fuel into the engine based on the anticipated power output of the generator set.

20. The non-transitory computer-readable storage medium of claim 16, further comprising instructions which, when executed using the one or more processors, cause the one or more processors to perform: disconnecting a sub-load via controlling an electrical connection to maintain an electrical load level lower than the power output of the generator set.

* * * * *